No. 846,211. PATENTED MAR. 5, 1907.
L. J. JOHNSON.
GRAIN RENOVATOR.
APPLICATION FILED NOV. 9, 1905.

Witnesses
Jas. A. Koehl.
C. H. Griesbauer.

Inventor
L. J. Johnson,
by H. B. Wilson
Attorney

UNITED STATES PATENT OFFICE.

LEWIS J. JOHNSON, OF SPRINGBAY, ILLINOIS.

GRAIN-RENOVATOR.

No. 846,211.        Specification of Letters Patent.        Patented March 5, 1907.

Application filed November 9, 1905. Serial No. 286,626.

*To all whom it may concern:*

Be it known that I, LEWIS J. JOHNSON, a citizen of the United States, residing at Springbay, in the county of Woodford and State of Illinois, have invented certain new and useful Improvements in Grain-Renovators; and I do declare the following to be a full, clear, and exact description of the invention, such as will enable others skilled in the art to which it appertains to make and use the same.

This invention relates to improvements in devices for renovating and cooling grain.

The object of the invention is to provide a simple, convenient, and efficient portable device which may be readily inserted in the grain in a bin, crib, boat, car, warehouse, or other container in order to permit currents of air or other cooling or fumigating gases to be forced through the grain to cool or renovate the same.

The above and other objects are accomplished by the construction illustrated in the accompanying drawings, in which—

Figure 1:
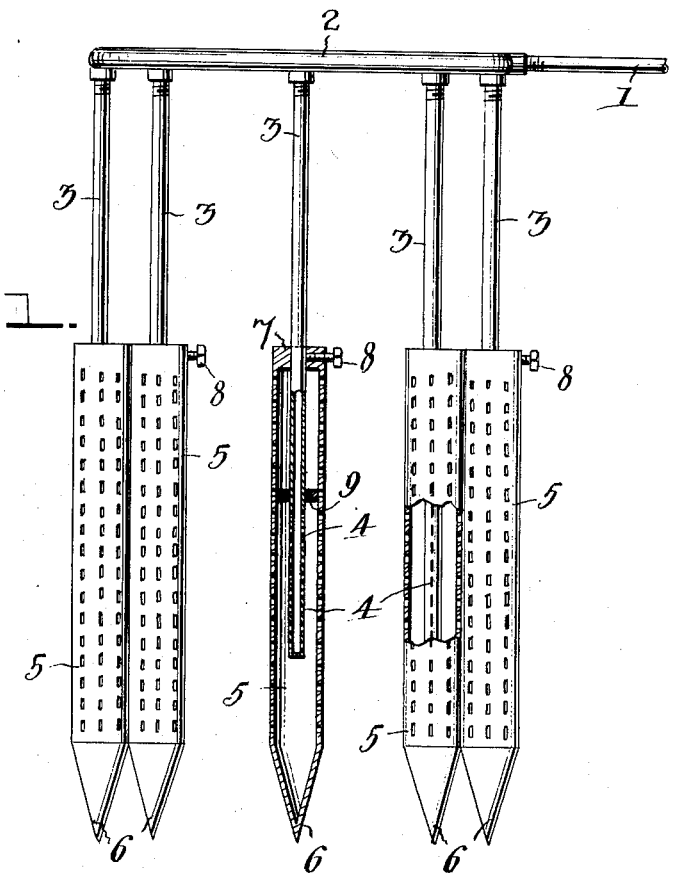
Figure 2:
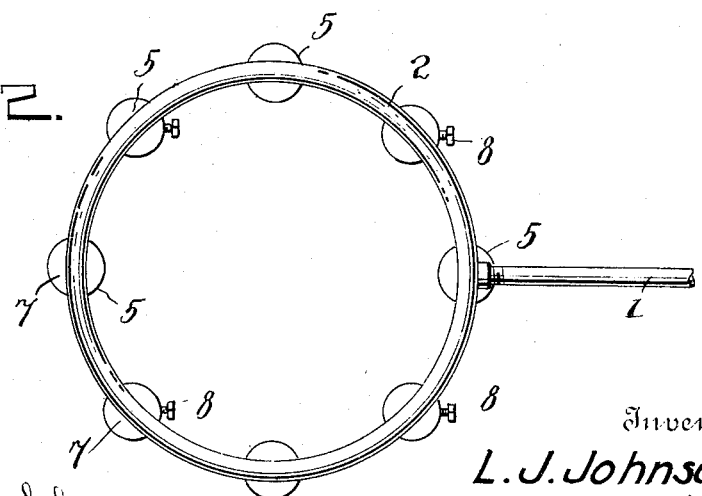

Figure 1 is a side elevation with parts in section of an apparatus constructed in accordance with my invention, and Fig. 2 is a top plan view of the same.

Referring to the drawings by numeral, 1 denotes a pipe or tube, either flexible or rigid, through which cooling and renovating currents of air or other gases are adapted to be forced by a pump or any other suitable apparatus. This pipe opens into a distributing-head 2, which is here shown in the form of a circular tube or pipe, but which may be of any other desired form and construction. Projecting from the distributer 2 is a plurality of discharge pipes or tubes 3, which have their lower or outer ends closed and formed for a short distance from said ends with series of slits or perforations 4. Slidably mounted upon the said ends of the pipes 2 are perforated casings 5, which are preferably in the form of cylindrical tubes or pipes into which the pipes 3 telescope. The pipes or casings 5 have tapered or pointed lower ends 6 to permit them to be readily forced into the grain, and their upper ends are closed by heads 7, through centrally-disposed openings in which the pipes 3 slide. The pipes or casings 5 may be secured in any adjusted position upon the pipes 3 in any suitable manner. As shown, I have provided set-screws 8 for this purpose. These set-screws pass through threaded openings in the heads 7 and are adapted to engage the pipes 3.

If desired, I may provide upon the pipes 3, at the inner ends of their perforated lower portion, circular heads 9, which slide in the pipes or casings 5 and prevent the discharge of air into the portions of said pipes or casings above said heads.

The use and advantages of the invention will be readily seen. When it is desired to cool, fumigate, or otherwise treat the grain in a bin, crib, boat, car, warehouse, or other container, the casings 5 are driven into the grain, the points 6 facilitating this operation. The pipes 3 are then adjusted in the pipes or casings 5, or, if desired, they may be adjusted beforehand, so that air or other gas discharged through the pipes 1, 2, and 3 will pass through the slits or perforations 4 in the lower ends of the pipes 3, then through the perforations in the casings or pipes 5, and then pass through the grain to cool and renovate it. By providing the heads 9 upon the pipes 3 and adjusting the latter in the casings or pipes 5 so that said heads are about on a level with the level of the grain into which the apparatus is inserted all of the air or gas will be caused to be discharged into and through the grain.

From the foregoing description, taken in connection with the accompanying drawings, the operation and advantages of the invention will be readily understood without requiring a more extended explanation.

Various changes in the form, proportion, and the minor details of construction may be resorted to without departing from the principle or sacrificing any of the advantages of the invention.

Having thus described my invention, what I claim as new, and desire to secure by Letters Patent, is—

1. The herein-described grain-renovating apparatus comprising the distributer-head, the pipe discharging thereinto, the discharge-pipes projecting from the distributer-head, the perforated cylindrical casings having the conical lower portions and the heads at their upper ends, said heads having openings in which the discharge-pipes are slidable and provided with clamping means to secure the said pipes therein, said casings being adjustable on said discharge-pipes toward and from said distributer-head.

2. The herein-described grain-renovating apparatus comprising the perforated casings having the tapered lower ends, the heads and the clamping-screws, and the distributer-head having the pipe discharging thereinto and the discharge-pipes projecting therefrom, said discharge-pipe extending through the heads of the casings, slidable in said heads, entering the casings and having the heads movable in said casings, substantially as described.

In testimony whereof I have hereunto set my hand in presence of two subscribing witnesses.

LEWIS J. JOHNSON.

Witnesses:
ISAAC JOHNSON,
JOSEPH F. BARTLEY.